3,323,181
FASTENER
Clifford Alexander Seckerson, Iver Heath, England, assignor to United-Carr Incorporated, a corporation of Delaware
Filed Feb. 17, 1964, Ser. No. 345,388
Claims priority, application Great Britain, Feb. 21, 1963, 7,114/63
2 Claims. (Cl. 24—73)

The present invention relates to an improved fastener which is particularly although not exclusively suitable for attaching a trim beading to the body panelling of a vehicle.

According to the invention there is provided a fastener for securing a flanged beading to an apertured support formed from a resilient plastics material and having a body, an undersurface on the body, means on the body adapted for engagement in the aperture in the support, a first undercut edge extending lengthwise along one side of the body and adapted to engage one flange of the beading, a pair of spaced resilient arms extending from opposite ends of the body on either side of the shank and projecting to the other side of the body and a second undercut edge on each arm extending lengthwise of the other side of the body and adapted to engage the other flange of the beading.

According to a further aspect of the invention there is also provided an assembly of a beading having inturned flanges secured to an apertured support with the aid of a plurality of fasteners as defined in the preceding paragraph in which the support is formed with a series of apertures, a fastener is engaged in each aperture in the support and the inturned flanges of the beading are secured under the undercut edges of the fasteners to hold the beading to the support.

A preferred form of the invention will now be described with reference to the accompanying diagrammatic drawings, in which.

Figure 1:
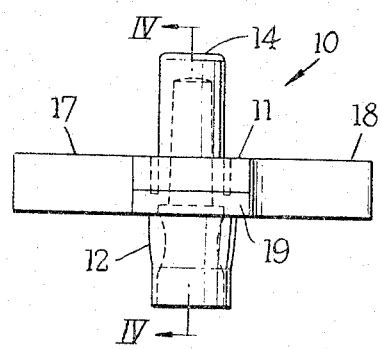
FIGURES 1 and 2 are respectively an elevation and under-plan of a fastener.
Figure 3:
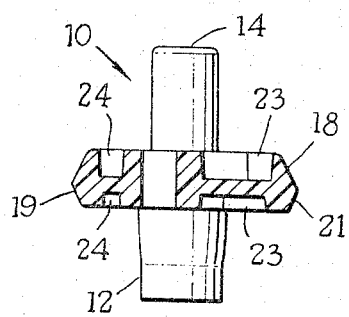
FIGURE 3 is a section through the fastener taken on the line III—III of FIGURE 2.
Figure 2:
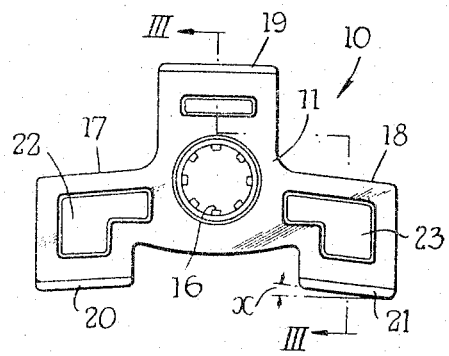

In FIGURES 1 to 3 a fastener is indicated generally at 10 which is formed from a suitable synthetic resin.

The fastener 10 comprises a body 11 and a shank 12 which is in the form of a tubular stud and which extends from the undersurface of the body.

A bore 13 extends into the body 11 from its upper surface and a hollow pin 14 is located in the bore so as to project beyond the upper surface of the body. The open end 15 of the pin 14 is joined to the wall of the bore 13 along a line of weakness which will break when the pin is depressed thus allowing the pin to be forced down into the tubular shank 12.

Longitudinal ribs 16 are formed on the inside of the tubular shank 12. The ribs 16 are equiangularly spaced around the shank and are longitudinally convex so as to provide a gradual interference when the pin 14 is forced into the shank thus expanding the wall of the shank outwardly.

The body 11 has two resilient arms 17 and 18, which extend outwardly from the body on either side of the shank 12 and a side of the body 11 is formed with an undercut edge 19. Each arm 17 and 18 is also formed with an undercut edge 20 and 21 respectively and, as will be seen from FIGURE 2, the edges 20 and 21 are oppositely facing with respect to the edge 19 and lie on the opposite side of the shank 12.

The undercut edge 19 on the side of the body 11 is substantially straight and the arms 17 and 18 are so arranged that the edges 20 and 21 are inclined to a line parallel to the edge 19.

Preferably, the angle of inclination which is indicated at "X" in FIGURE 2 is of the order of 5°.

The upper and lower surfaces of the arms 17 and 18 are formed with L-shaped recesses 22 and 23 respectively which save material and also increase the flexibility of the arms.

The body 11 is also formed with rectangular recesses 24 parallel to the edge 19.

Figure 4:
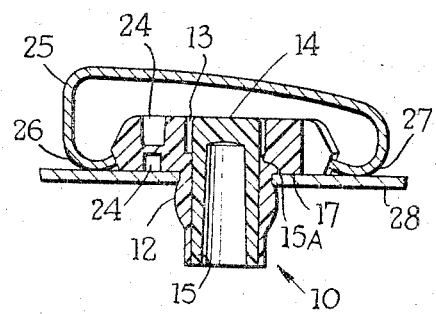
FIGURE 4 is an elevation partly in section showing the fastener of FIGURES 1 to 3 holding a beading to a support panel and FIGURE 5 is a plan view showing a modification of the fastener of FIGURES 1 to 4 holding a beading to a panel, the beading being broken away.

The fastener 10 is used to attach a beading 25 having inturned flanges 26 and 27 to a panel 28 in a manner shown in FIGURE 4.

The panel 28 is formed with a row of aligned circular apertures 29 and a fastener 10 is engaged in each aperture by inserting the shank 12 of each fastener through the aperture and then hammering the pin 14 into the shank. As the pin enters the shank it engages the ribs 16 and forces the wall of the shank outwardly thus locking the shank 12 in the aperture.

When the fasteners are attached to the panel 28 the undercut edges 19 are aligned so as to be approximately parallel to a line passing through the apertures in the panel. The beading 25 is either slid over the fasteners with the inturned flanges 26 and 27 engaged under the undercut edges of the fasteners or alternatively one flange is engaged under the undercut edges on one side of the fasteners and the other flange is then pressed down into snap-engagement over the undercut edges on the other side of the fasteners.

It will be seen from FIGURE 2 that the arms 17 and 18 extend outwardly from either side of the body in the general direction of the beading to be engaged and the arms are sufficiently flexible to allow the edges 20 and 21 to be pinched towards the edge 19. Thus the fastener 10 will accommodate and hold beadings of different width or beadings having variations in their width as a result of manufacturing faults.

The amount of tolerance which the fastener 10 will accommodate can be varied both by lengthening the arms 17 and 18 and thus increasing their flexibility and the extent to which they can be pinched towards the edge 19 and by increasing the angle of inclination "X" of the edges 20 and 21.

It will be seen that the edge 19 on the fastener 10 provides a relatively rigid grip on the flange of the beading in comparison to the edges 20 and 21 which are located on the flexible arms 17 and 18 and it may be desirable, for instance if it is necessary to provide a strong and even grip on the beading, to alternate the fasteners along the beading so that each flange of the beading is held alternately by a rigid edge 19 of one fastener and then by the resilient edges 20, 21 of the next fastener.

The extent of the grip provided by the edges 19, 20 and 21 may also be varied by varying the angle of undercut.

For instance, the undercut on the edges 20 and 21 may be made more acute than that of the edge 19 to offset the resilience in the arms 17 and 18 and thus provide an equally strong grip on both sides of the fastener.

It will be appreciated that the undercut edges 20, 21 on the arms 17, 18 may be formed substantially in alignment and parallel with the edge 19. In addition, alternative means may be provided for attaching the body 11 to the support. For instance, the body may be formed with a central aperture in place of the pin and tubular shank and a conventional rivet passed through the apertures in the body and the support to attach the fastener thereto.

Figure 5:
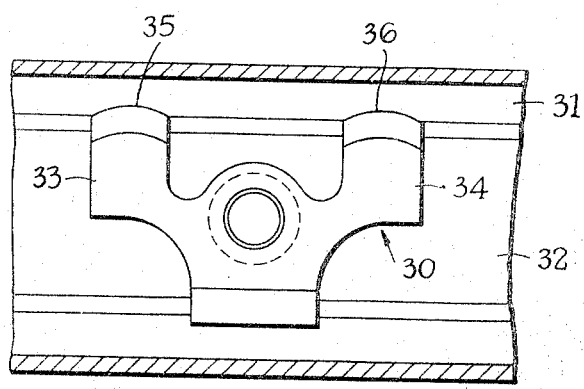

A modification of the fastener 10 is indicated generally at 30 in FIGURE 5 holding a beading 31 to an apertured panel 32 in the same manner as the fastener 10.

The fastener 30 is similar to the fastener 10 except that the body is provided with arms 33 and 34 which are more flexible than the arms 17 and 18 of the fastener 10 and will thus accommodate a wider range of beading.

In addition, the beading engaging, undercut edges 35 and 36 on the arms 33 and 34 respectively, are convex so that the beading 31 can be slid over the fasteners more easily during assembly.

What I claim is:

1. A fastener formed of a resilient plastic material for securing a flanged beading to an apertured support, said fastener comprising a relatively rigid central body portion, means on said body portion for attaching said fastener to the support, a first undercut edge which is rigid on one end of said body portion, said first undercut edge extending along the length of said one end and being adapted to rigidly engage one flange of the beading, a pair of spaced arms extending laterally outwardly from opposite sides of said body portion and each having a free end portion projecting towards and beyond the other end of said body portion, said arms being resilient and laterally deflectable with respect to said body portion, and second undercut edges on the free end of each of said arms, said second undercut edges extending along the length of each of said free ends and being adapted to resiliently engage the other flange of the beading.

2. A fastener according to claim 1 wherein said first undercut edge is substantially straight and said second undercut edges are substantially straight and inclined to a line parallel to said first undercut edge and extending towards the center of said body portion whereby upon lateral deflection of said arms towards the longitudinal axis of said fastener, said second undercut edges are moved towards a parallel relationship with the longitudinal axis of said fastener and said first undercut edge.

References Cited

UNITED STATES PATENTS

| | | | |
|---|---|---|---|
| 2,184,255 | 12/1939 | Kral | 52—718 X |
| 3,019,498 | 2/1962 | Brown | 24—73 |
| 3,114,949 | 12/1963 | Meyer | 24—73 |
| 3,130,822 | 4/1964 | Meyer | 52—718 |
| 3,203,304 | 8/1965 | Rapata | 24—73 X |

FOREIGN PATENTS 1,350,859   12/1962   France.

DAVID J. WILLIAMOWSKY, *Primary Examiner.*

D. L. TAYLOR, *Assistant Examiner.*